United States Patent
Hauser

(10) Patent No.: US 6,810,618 B1
(45) Date of Patent: Nov. 2, 2004

(54) SUPPORT FOR A FLEXIBLE TREE COVERING

(76) Inventor: Ray L. Hauser, 5758 Rustic Knolls Dr., Boulder, CO (US) 80301

( * ) Notice: Subject to any disclaimer, the term of this patent is extended or adjusted under 35 U.S.C. 154(b) by 0 days.

(21) Appl. No.: 10/681,435

(22) Filed: Oct. 8, 2003

(51) Int. Cl.[7] .......................... A01G 17/04; A01G 13/02
(52) U.S. Cl. .............................. 47/23.2; 47/29.6; 47/45
(58) Field of Search ................................ 47/23.2, 23.1, 47/29.1, 29.2, 29.6, 31, 45

(56) References Cited

U.S. PATENT DOCUMENTS

| | | | |
|---|---|---|---|
| 199,353 A | * | 1/1878 | Clark ............................. 47/45 |
| 641,946 A | | 1/1900 | McFarland |
| 1,072,340 A | * | 9/1913 | Liljegran ..................... 47/23.2 |
| 1,748,085 A | | 2/1930 | Shorey |
| 4,304,068 A | * | 12/1981 | Beder ............................. 47/17 |
| 5,930,948 A | | 8/1999 | Daniel |
| 6,088,953 A | | 7/2000 | Morgan |
| 6,357,174 B1 | * | 3/2002 | Hernick ......................... 47/45 |

FOREIGN PATENT DOCUMENTS

| | | | | |
|---|---|---|---|---|
| DE | 19512530 A1 | * | 11/1996 | ............ A01G/9/12 |
| DE | 20217991 U1 | * | 1/2003 | .......... A01G/13/02 |
| JP | 404179418 A | * | 6/1992 | .......... A01G/13/02 |
| JP | 2000069862 A | * | 3/2000 | .......... A01G/13/02 |
| JP | 2002112644 A | * | 4/2002 | .......... A01G/13/02 |

* cited by examiner

*Primary Examiner*—Son T. Nguyen
(74) *Attorney, Agent, or Firm*—David Kiewit

(57) ABSTRACT

An easily and installed support for a flexible covering, such as a bird-excluding net or a thermal blanket, may be made from lightweight and readily available plastic pipe components. The support is configured as a wheel and a vertical center pole that can hold the wheel in a horizontal position above the tree, similar to an umbrella. Netting or other flexible covering is attached to the wheel before it is lifted on the center pole and carried to a tree that is to be covered.

9 Claims, 4 Drawing Sheets

SUPPORT FOR A FLEXIBLE TREE COVERING

BACKGROUND OF THE INVENTION

1. Field of the Invention

This invention provides method and apparatus for covering a tree with a flexible covering. In one regard, it relates to supporting netting over a fruit tree to protect the fruit from birds. In another, it relates to supporting a thermal shroud over a tree to protect its buds and blossoms from damage by frost.

2. Background Information

Protective netting has been available for many years under tradenames such as Bird Block, BirdBGone and Bird-X for use over fruit trees, and particularly over cherry trees. Cherries are very vulnerable to birds and provide a nice dessert to their otherwise mundane diets. Birds often strip a tree of all its cherries long before they become fully ripe for picking.

Nets are cumbersome to place onto a tree and are cumbersome to remove. Some net suppliers have suggested using a pole to place a net over a tree. Some users have rolled the netting into two parallel rolls so that the rolls can be placed over a tree, and the netting subsequently unrolled. Because the small outer limbs and fruit can become entangled in the netting, the net must be carefully lifted and pulled into place, which can strip fruit off the tree. This problem occurs during both placement and removal of the netting.

In many prior art fruit protection arrangements, the weight of the netting is supported by the branches of the tree, thus pulling down small branches to give a "weeping willow" effect if the nets are in place for a long time.

In U.S. Pat. No. 5,930,948, Daniel teaches an arrangement for protecting a plant that involves a large number of custom-designed components which must be custom-manufactured at considerable expense.

In U.S. Pat. No. 6,088,953, Morgan describes a collapsible protective plant cover that uses a center pole, spokes and coaxial support rings of spring steel to support a flexible plant covering. A feature of this system is an arrangement for collapsing the support rings for storage. Like the Daniel patent, Morgan's device involves custom-manufactured components that are of a fixed size and that do not accommodate growth of the plant.

SUMMARY OF THE INVENTION

One aspect of the invention is that it provides a kit for assembly into a support for a covering for a tree having a predetermined tree height, a predetermined tree diameter and a calculated tree circumference. A preferred embodiment of this kit may be used with a rigid tubular member having a length that is at least three quarters and not more than one and one half times the tree height; a flexible tubular member having two ends and having a length that is at least one half the tree circumference and not more than one and one half times the tree circumference; and at least four spoke members, each having a respective length that is at least one third of the tree diameter and not more than three quarters of the tree diameter. The preferred kit comprises a plurality of fittings used to interconnect the various tubular elements. These preferably comprise at least one central fitting slidably interfitting over an upper end of the rigid tubular member. Each central fitting has a center pole socket for receiving the center pole and at least two transverse sockets having an internal diameter selected to slidably fit about a respective central or proximal end of one of the spoke members. In addition, there are at least three through-tee fittings, each of which has an axial throughhole large enough for the flexible tubular member to pass entirely through the fitting. Each through-tee fitting also has a side arm tee socket disposed transverse to the axial throughhole and having a diameter selected to slidably fit about a respective distal end of one of the spoke members. A circumferential fitting that is preferably a tube coupling but that may be a tee fitting is used to receive both of the two ends of the flexible tubular member in respective openings so as to form a circular wheel-like portion of the support.

Another aspect of the invention is that it provides a method of placing a flexible cover over a tree having a predetermined tree height, a predetermined tree diameter and a calculated tree circumference, where the flexible cover is selected to be substantially larger than the tree diameter. This method preferably comprises the steps of:

a) sliding a selected number, equal to or greater than three, of through-tee fittings onto a flexible tubular member having two ends and having a length substantially equal to the tree circumference;

b) bending the flexible tube to form a support wheel having a wheel circumference substantially equal to the tree circumference and then attaching the two ends of the flexible tube together by the use of a circumferential fitting that is either a tube coupling or a tee fitting;

c) connecting each of the through-tee fittings to an associated central fitting by means of a respective spoke member, d) folding the flexible cover, preferably along two parallel lines so as to define three panels having approximately the same width;

e) placing the folded cover on a working surface so that the central panel of the flexible cover is uppermost and so that the rest of the flexible cover is disposed beneath the central panel;

f) placing the support wheel on the central portion of the flexible cover and attaching the central panel of the cover to the support wheel at three or more places along the circumference of the wheel;

g) inserting one end of a rigid center pipe into or through a respective hole in each of the central fittings, where the center pipe may pass through one or more proximal central fittings before being inserted into a blind hole in a central cap fitting;

h) inverting the center pipe so as to define an assembly comprising a folded flexible cover draped across a horizontally disposed support wheel supported by the vertically disposed center pipe;

i) conveying that assembly towards the tree until the center pipe is adjacent the trunk of the tree;

j) fastening the center pipe to the trunk of the tree by lashing or other suitable means; and k) unfolding the flexible cover so as to drape the flexible cover over the tree.

One aspect of the present invention is that it provides for easy assembly, easy placement, and easy disassembly of a protective cover for a tree.

Another aspect of preferred embodiments of the invention is that they provide an opportunity for the user to increase the size of the protective device to accommodate growth of a tree. This is done by simply adding couplings and pipe sections as described below.

Preferred embodiments of the present device differ from the prior art in being assembled from light-weight plastic parts many of which are conventionally available at low cost.

A preferred embodiment of the invention comprises a kit of special parts to permit assembly of a device for supporting a tree covering and a process for use of the device.

A preferred embodiment of the present device is configured as a wheel attached to a vertical center pole that holds the wheel in a horizontal position, similar to an umbrella. Netting or other flexible covering is attached to the wheel prior to placement over a tree. The diameter of the wheel is made approximately equal to the largest horizontal diameter of the tree, and the pole is made approximately equal to the height of the tree. The netting or other flexible covering should preferably be of dimensions sufficiently large to fully cover both the support apparatus and the tree, which means that its minimum dimension can be equal to twice the height of the tree plus the diameter of the tree. Alternately, a netting with a width one and six tenths times the diameter of the tree and a length equal to the sum of twice the height plus the diameter can be used if its edges are attached to one another after placement over the tree.

A preferred kit of this invention comprises special plastic pipe fittings to which commercial plastic pipe and fittings are added to make the complete device. The special fittings of this kit are custom-sized to slip over commercial polyethylene irrigation pipe and over PVC pipe, thus providing for a low-cost support for the netting.

Preferred embodiments of the present device also hold the netting surrounding the tree so that fruit near the tree circumference is better protected from predators than by a net supported by the tree and pulled tightly against the outer branches by its own weight Although it is believed that the foregoing rather broad recital of features and technical advantages may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed herein as a basis for designing other arrangements for carrying out the same purposes of the present invention. Those skilled in the art will realize that such equivalent constructions are within the spirit and scope of the invention in its broadest form. Moreover, it may be noted that various embodiments of the invention may provide various combinations of the hereinbefore recited features and advantages of the invention, and that less than all of the recited features and advantages may be provided by some embodiments.

DETAILED DESCRIPTION

In studying this Detailed Description, the reader may be aided by noting definitions of certain words and phrases used throughout this patent document Wherever those definitions are provided, those of ordinary skill in the art should understand that in many, if not most instances, such definitions apply to prior, as well as future uses of such defined words and phrases. At the outset of this Description, one may note that the terms "include" and "comprise," as well as derivatives thereof, mean inclusion without limitation; the term "or," is inclusive, meaning and/or; the term "wheel" is used to describe a generally circular wheel-like portion of a net support comprising a plurality of radially oriented spoke members and a circumferential member; the term "net" stands for any sort of flexible covering usable with a tree and, in addition to anti-bird nets, may include, without limit, thermal blankets, fumigation hoods and the like. Moreover, the skilled reader will recognize that many of the exemplar dimensions used in this Description refer to nominal sizes conventionally used in the plumbing and irrigation trades and thus do not denote an exact measurement of the item so described.

Figure 1:
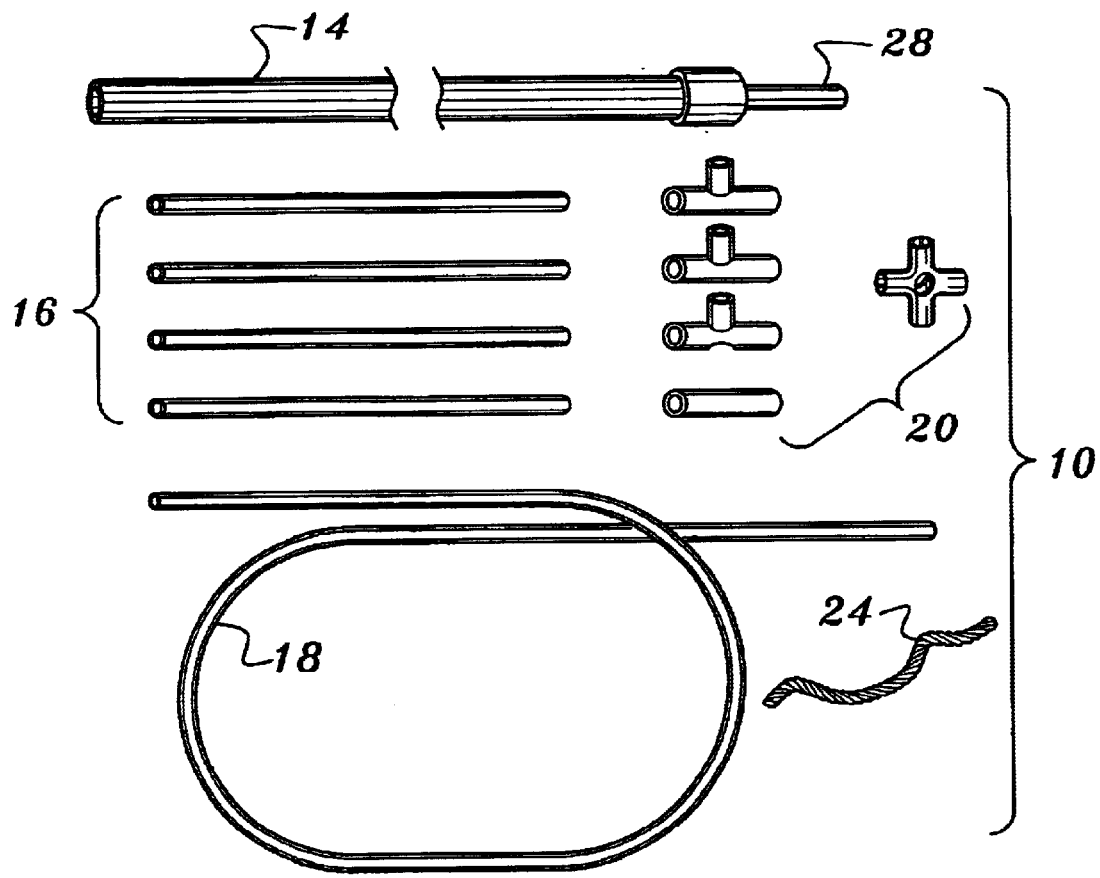
FIG. 1 is a plan view of a kit of components for assembly into a support for a flexible covering for a tree.

Turning now to FIG. 1, one finds a collection of components 10 that can be assembled to form a net support 12 for use with a selected tree. In a preferred embodiment the set of components comprises a center pole 14, a plurality of spoke tubes 16, a flexible pipe 18; a plurality of fittings 20 and, optionally, a net or other flexible cover 22 and one or more pieces of rope 24.

The various tubes are preferably made of any of a variety of readily cut plastic materials, such as PVC, so that a user can cut various of the parts to appropriate lengths to fit the apparatus to a selected tree 50. The center pole 14 is generally selected to have a length approximately equal to the height of the selected tree, and each of the spoke tubes 16 is cut to a length approximately equal to one half the effective diameter of the selected tree, where the "effective diameter" is defined as being the longest horizontal line passing through the tree trunk and extending from the outermost branch on one side to the outermost branch on the other. The flexible tube 18 is preferably cut to have a length substantially equal to the circumference of the tree, which is defined to be pi times the effective diameter. This choice of dimensions ensures that a net supported by the net support 12 can cover the entire tree without having any portion of the net supported by the branches, which would be the case if one were to use a smaller diameter for the support wheel 26.

In a particular preferred embodiment, the center pole 14 may be a rigid plastic pipe such as a nominal ¾ inch or one inch PVC pipe. In order to prevent central fittings from sliding down the center pipe, a slide stop is preferably provided. This may comprise a reduced diameter top portion 28, which may be formed by using a reducing fitting and a short piece of smaller diameter pipe. Alternately, the same functionality may be provided by other means, such as attaching a suitable sleeve around the center pipe 14 or placing a transverse pin through the center pole at a selected height in order to define the upper end of the center pole along which various central fittings are deployed. It will be understood that there are many approaches to retaining the central fittings adjacent the top of the center pole. These include, without limitation, a choice of sizes that allows for a snug; friction-fit, fastening various of the fittings to a cap fitting having a blind hole socket for the center pole, as well as providing any of the stop means discussed above.

In a preferred embodiment the spoke tubes 16 are also made of a rigid plastic pipe such as ¾ inch PVC. The associated flexible tube 18, which is used to form the circumference of the wheel-like subassembly 26, may be ¾ inch polyethylene irrigation pipe, which is cut to have a length approximately matching the circumference of the tree.

The set of fittings 20 used to connect the various tubular members may comprise various mixes of conventional arid modified plumbing fittings such as tees, crosses, and connectors. Some of the these fittings may be slip fittings that have socket sizes modified or selected to allow various of the tubes to fit entirely through the fitting, rather than being arrested by an internal socket wall or set of threads. In one embodiment, the fittings that slip about a ¾" PVC central pipe are bored out to an internal diameter of about 1.125 inches and the ones that fit about a ¾" polyethylene pipe have an internal diameter of about one inch. Although the modified fittings made for a prototype net support were formed by cutting operations on conventional fittings, those skilled in the art will recognize that this is an economic decision and that if the market for such supports is large enough, one could readily mold the slip fittings.

Figure 2:
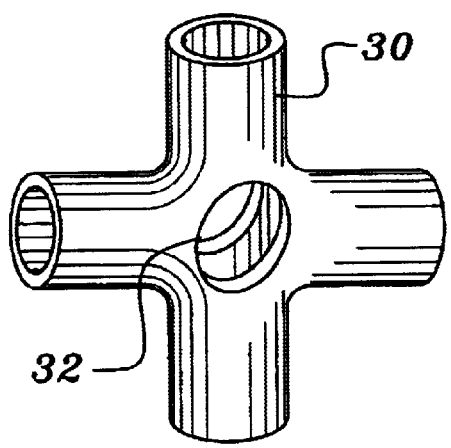
FIG. 2 is an elevational view of a modified cross fitting
Figure 3:
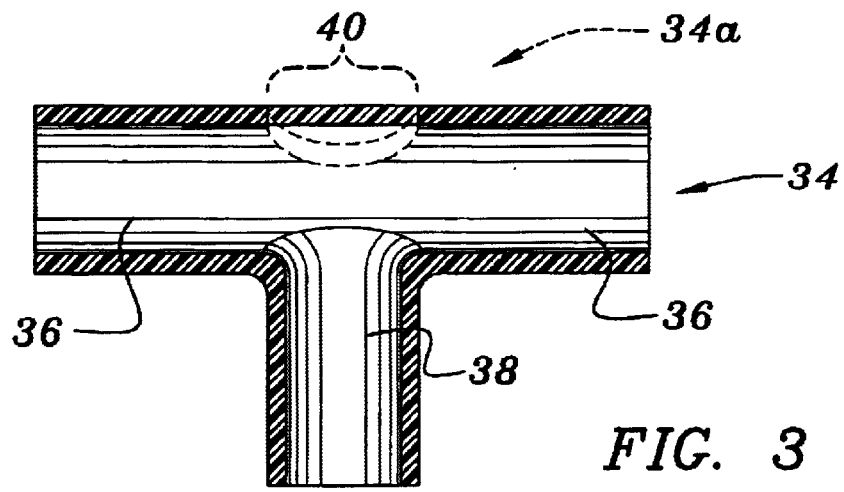
FIG. 3 is a cross-sectional view of a modified tee fitting

A modified cross fitting 30, as depicted in FIG. 2 may have a hole 32 in it perpendicular to the plane of the fitting, where the diameter of the hole is selected to provide an easy slip fit about the top portion 28 of the center pole 14. The hole 32 may be a throughhole, as depicted, or may have the hole 32 drilled in only one side of the fitting 30 so that the fitting 30 provides a cap fitting for use at the upper end of the center pole.

Each set of fittings may include a cap fitting intended for use on the top of the central pole. A cap fitting, as described herein, is one that provides a socket that the center pole can fit into without being able to pass all the way through the fitting. In addition to the modified cross fitting 30 described above, which provides sockets for four spoke tubes 16, some embodiments of the invention employ a plumbing tee, which provides for two spoke tubes, as a cap fitting.

Figure 4:
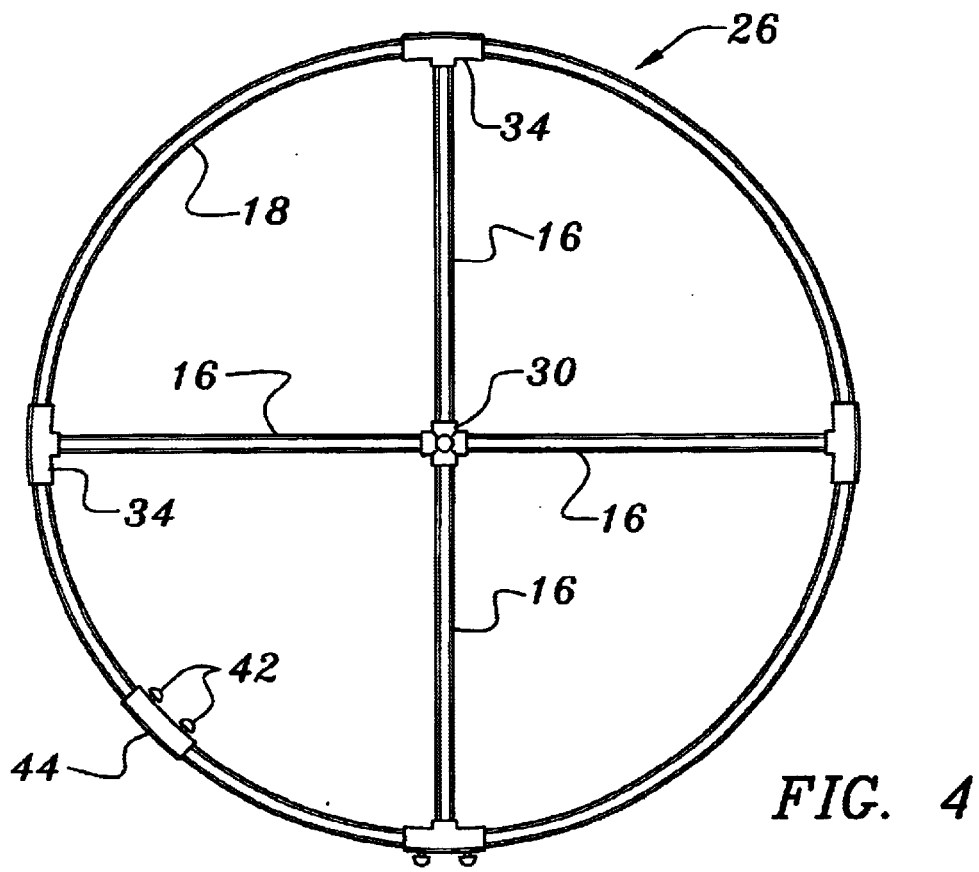
FIG. 4 is a plan view of a wheel-like subassembly of a net support of the invention.

In the interest of clarity of presentation, the wheel-like structure is depicted in FIG. 4 as having only four spoke tubes. It will be recognized that additional spokes can by added by stacking two of the modified cross fittings 30 on the upper end of the center pole 14. In this case the two crosses 30 would have their respective pipe ports offset from each other by forty five degrees of arc so as to provide a total of eight equally spaced radial spokes. In an arrangement of this sort, of course, only the uppermore of the modified crosses 30 would have a hole 32 in only one side, so as to act as a cap fitting. The other or others would have throughholes to allow for the stacking operation. Alternately, as discussed hereinafter, a stack of modified tee fittings can be strung out along the upper end of the center pole.

A modified tee fitting 34 is preferably used at the distal or outer end of each of the spoke tubes 16 to connect the spoke tubes to the circumferential tube 18. The modified tee 34 may be formed from a conventional plumbing tee by reaming out the two main arms 36 of the conventional tee so as to allow the flexible circumferential tube to pass easily through the modified tee 34.

In some embodiments of the invention, a cut-out tee fitting 34a is made by boring out the side arm 38 and drilling a hole 40 through the fitting wall opposite the side arm. A cut-out fitting 34a of this sort can be used at the central end of two spoke tubes to connect diametrically aligned pairs of the spoke tubes to the center pole. In an arrangement of this sort, several cut-out tee fittings, one for each pair of spokes, arc stacked on the upper end of the center pole.

It may be noted that the apparatus of the invention can be modified easily to accommodate growth of a tree. Additional couplings and pipe sections can be added to the spoke and circumferential tubes to accommodate growth. For example, if the tree's diameter increases from seven feet to nine feet, the polyethylene pipe will need another section about six feet long with an added slip coupling, and the spokes will each need a PVC pipe section about eleven and one half inches long as well as a respective coupling for attachment to the original spoke. Growth in height of the tree is similarly accommodated by adding a PVC pipe section and a PVC coupling to the center pole.

Those accustomed to working with plastic pipes and the like will appreciate that the various fittings can be assembled and disassembled with frictional forces holding them in place. Alternately suitable clamping arrangements, such as set screws 42, can be used, or the fittings can be permanently cemented together. The choice depends upon a number of factors including the user's arrangements for storage during off-season and the expected wind loading on the apparatus when in use.

A preferred process of protecting a tree with a net or other flexible covering begins-with a step of measuring the diameter and height of the tree to be protected and then procuring a net and a support kit designed for the measured tree size. The net, which is commonly square or rectangular, preferably has a side with a length at least the sum of tree diameter and two times the tree height, e.g. a tree seven feet diameter and six feet high should have a net at least 7+6+6=19 feet on one of its sides. The tubular components of the kit are then cut to the desired sizes, as described above, so as to allow for the fabrication of a support that can hold the net above and around the tree without requiring the tree to bear any of the weight of the netting.

A wheel-like upper support 26 is then assembled by using the various tubular elements and fittings. This is preferably done by first sliding a selected number of tee fittings 34 onto the flexible pipe 18, bending the flexible pipe into a circle and connecting the two ends of the flexible pipe together with an in-line connector 44. Those skilled in the art will recognize that there are other ways of connecting the two ends together and that these comprise, but are not limited to bringing the two ends of the flexible pipe together into one of the modified tee fittings.

After the circle is formed, a circumferential end of a respective spoke tube 16 is inserted into the side arm port 38 of each of the tee fittings slidably disposed on the flexible tube. The central ends of the spoke tubes are then connected together by one or more central fittings, which comprise some combination of one or more modified cross fitting(s) 30 or two or more cut-out 34a or modified 34 tee fittings. This fitting, or set of aligned fittings, prepares the wheel for the subsequent insertion of the center pole.

Although FIG. 4, in the interest of clarity of presentation, depicts a minimal such upper support having four spokes, preferred upper supports use six or eight spokes. The four spoke wheel can be made using either a single modified cross 30 or two modified tees. A six spoke wheel can be made using three of the cut-out tee fittings 34a to connect three pairs of spokes 16 at the center of the wheel. An eight spoke wheel can be made by using two stacked modified crosses. In any of these configurations, the uppermost fitting may-be bored through, so that the center pole projects through it, or may be a cap fitting in which the center pole is received within, but can not pass entirely through, the fitting.

Figure 5:
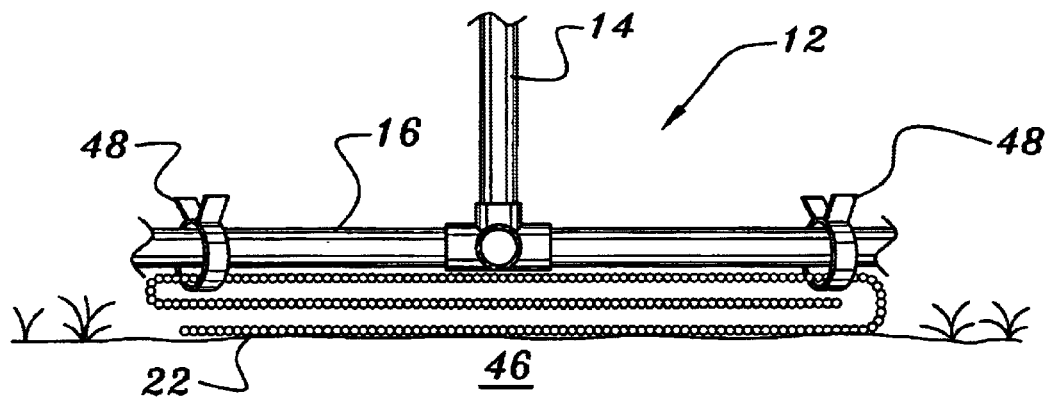
FIG. 5 is a partly cut-away side elevational view of an inverted support apparatus of the invention attached to a folded net
Figure 6:
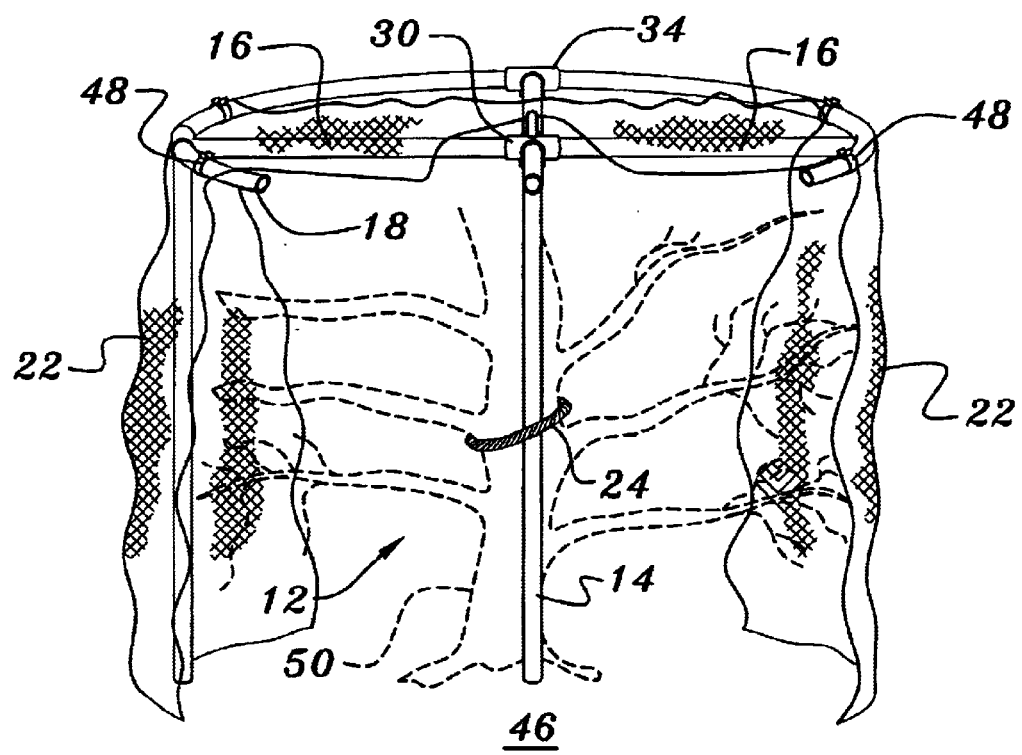
FIG. 6 is an elevational view of a support of the invention attached to a tree that is to be protected by unfolding a net attached to the support.

Once the wheel has been assembled, it is placed upon a net that has preferably been folded into thirds along two parallel lines aligned with the edges of the net. The folded net, as depicted in FIG. 5, is preferably positioned on the ground or other working surface with the central third uppermost before the wheel is placed upon it. The wheel and the uppermost panel of the net are then connected by means of strings, wire tie wraps, clamps or other removable fasteners 48.

The center pole is then inserted into the central fitting or fittings and is used to invert the wheel and net assembly into its normal upright orientation with the net on top of the wheel. In the preferred process, before unfolding the net the installer carries the net and support assembly to the tree 50 that is to be protected and fastens the center pole to the trunk of the tree by lashing, or other suitable means. It will be understood that other methods of supporting the center pole, such as inserting its bottom end into a hole in the ground, are also possible, but the simple lashing approach is recommended by both its ease and its low risk of damage to the tree. Once the support assembly is emplaced by the tree, the net can be unfolded to drape entirely around the tree. The netting may be tied around the trunk of the tree or it may be held down to the ground with rocks or other weights.

Figure 7:
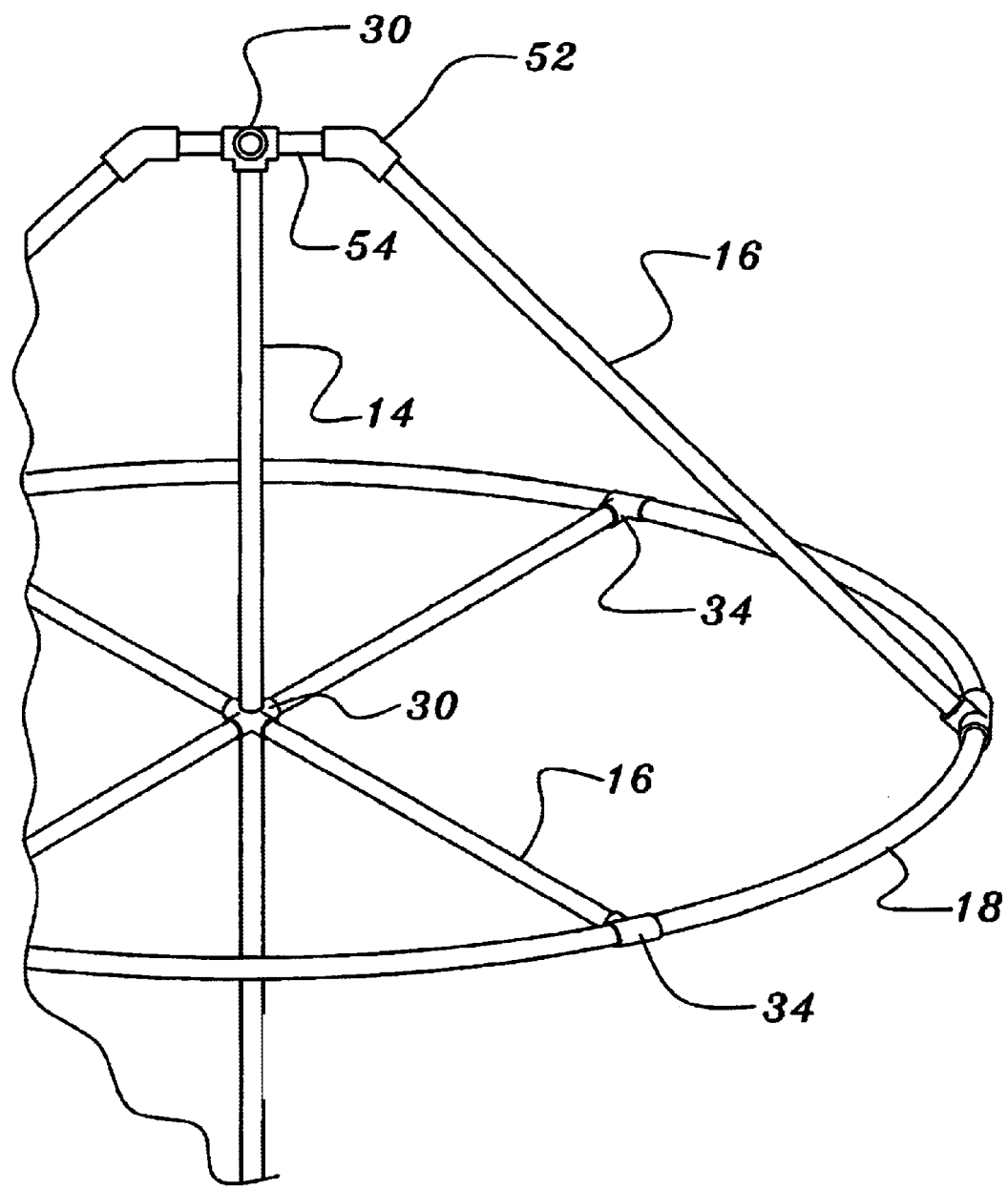
FIG. 7 is a partly cut-away elevational view of a second embodiment of the support apparatus useful for supporting a flexible cover that can shed snow.

Although the preferred embodiment described above can be used to support many sorts of flexible coverings in addition to anti-bird nets, an alternate 'wheel and cone' embodiment, depicted in FIG. 7, is preferred for use with thermal covers and the like when snowfall is anticipated. This embodiment, which uses at least two central fittings and at least eight spoke tubes, provides for a slanted, snow-shedding, top surface of the flexible covering. The cone portion of the wheel and cone assembly is formed by adding a second set of slanted spoke tubes 16 connected at their distal ends to the circumferential tube 18 by a slip tee fitting 34, as described hereinbefore. The central end of each slanted spoke tube may be inserted into a respective slanted elbow fitting 52 (e.g. a conventional forty five degree plumbing elbow) that is, in turn, connected to an upper one of the at least two central fittings by a short piece of pipe 54.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

I claim:

1. A kit for use in making a support for a flexible covering for a tree having a predetermined tree height, a predetermined tree diameter and a calculated tree circumference, the support comprising:
   a center pole having a length that is at least three quarters and not more than one and one half times the tree height;
   a flexible tubular member having a selected outer diameter;
   at least four spoke members, each having a respective length that is at least one quarter of the tree diameter and not more than three quarters of the tree diameter;
   the kit comprising:
   at least one central fitting having a center pole socket for slidably receiving an upper end of the center pole, each of the at least one central fitting having at least two transverse sockets disposed transverse to the center pole socket, each of the transverse sockets having an internal diameter selected to slidably fit about a respective proximal end of one of the spoke members; and
   at least three through-tee fittings, each through-tee fitting having an axial throughhole large enough for the flexible tubular member to pass entirely through the fitting, each through-tee fitting also having a tee socket disposed transverse to the axial throughhole, each tee socket having a diameter selected to slidably fit about a respective distal end of one of the spoke members.

2. The kit of claim 1 wherein at least one central fitting comprises a cap fitting having four transverse sockets.

3. The kit of claim 1 wherein at least one central fitting comprises a cap fitting having exactly two transverse sockets.

4. The kit of claim 1 wherein at least one central fitting comprises a throughhole aligned with the center pole socket so that the center pole can pass entirely through the at least one central fitting, the at least one central fitting further comprising at least two transverse sockets.

5. The kit of claim 1 further comprising a plurality of slanted elbow fittings.

6. A method of placing a flexible cover over a tree having a predetermined tree height, a predetermined tree diameter and a calculated tree circumference, the flexible cover selected to be substantially larger than the predetermined diameter, the method comprising the steps of:
   a) sliding a selected number, equal to or greater than three, of through-tee fittings onto a flexible tubular member having two ends and having a length substantially equal to the tree circumference;
   b) bending the flexible tube to form a support wheel having a wheel circumference substantially equal to the tree circumference and then attaching the two ends of the flexible tube together;
   c) connecting, by means of respective spoke members, each of the through-tee fittings to an associated central fitting;
   d) folding the flexible cover and placing it on a working surface so that a central portion of the flexible cover, having a width substantially equal to the predetermined diameter, is uppermost and so that the rest of the flexible cover is disposed beneath the central portion thereof;
   e) placing the support wheel on the central portion of the flexible cover and attaching the central portion of the cover to the support wheel at three or more places along the circumference thereof;
   f) inserting one end of a rigid tubular member through a respective throughhole in each of the central fittings;
   g) inverting the rigid tubular member so as to define an assembly comprising a folded flexible cover draped across a horizontally disposed support wheel supported by the vertically disposed rigid tubular member;
   h) conveying the assembly so formed towards the tree so that the rigid tubular member is adjacent a trunk of the tree; and
   i) unfolding the flexible cover so as to drape the flexible cover over the tree.

7. The method of claim 6 wherein spoke members are connected to an associated central fitting in a pair-wise fashion wherein the two spoke members of each pair extend diametrically across the support wheel.

8. A support for a flexible covering for a tree having a predetermined tree height, a predetermined tree diameter and a calculated tree circumference, the support comprising:
   a center pole having a length that is at least three quarters and not more than one and one half times the tree height;

a flexible tubular member having two ends and having a length that is at least one half the tree circumference and not more than one and one half times the tree circumference, the flexible tubular member having a selected outer diameter;

at least four spoke members, each having a respective length that is at least one quarter of the tree diameter and not more than three quarters of the tree diameter;

at least one central fitting having a center pole socket for slidably receiving an upper end of the center pole, each central fitting having at least two transverse sockets disposed transverse to the center pole socket, each of the transverse sockets having an internal diameter selected to slidably fit about a respective proximal end of one of the spoke members;

at least three through-tee fittings, each through-tee fitting having an axial throughhole large enough for the flexible tubular member to pass entirely through the fitting, each through-tee fitting also having a tee socket disposed transverse to the axial throughhole, each tee socket having a diameter selected to slidably fit about a respective distal end of one of the spoke members; and a circumferential fitting comprising one of a tube coupling and a tee fitting, the circumferential fitting for receiving each of the two ends of the flexible tubular member in a respective opening.

9. The support of claim 8 comprising at least eight spoke members and at least two central fittings, the support further comprising at least four slanted elbow fittings.

* * * * *